United States Patent [19]

Schenk

[11] Patent Number: 4,838,391
[45] Date of Patent: Jun. 13, 1989

[54] BRAKING DEVICE

[75] Inventor: Richard C. Schenk, Webster, N.Y.

[73] Assignee: Xerox Corporation, Stamford, Conn.

[21] Appl. No.: 240,337

[22] Filed: Sep. 6, 1988

[51] Int. Cl.⁴ .............................................. F16D 59/02
[52] U.S. Cl. .................................. 188/171; 188/70 B;
 188/259; 192/109 A
[58] Field of Search ................. 188/70 B, 70 R, 73.1,
 188/162, 171, 249, 259; 192/107 C, 109 A, 109 B

[56] References Cited
U.S. PATENT DOCUMENTS

| | | | |
|---|---|---|---|
| 2,850,124 | 9/1958 | Grote | 192/109 A |
| 3,822,768 | 7/1974 | Sebulke | 188/70 R |
| 4,030,576 | 6/1977 | Pringle | 188/71.8 |
| 4,099,601 | 7/1978 | Pittman | 188/163 |
| 4,103,763 | 8/1978 | Glockner et al. | 192/2 |

Primary Examiner—Duane A. Reger
Attorney, Agent, or Firm—H. Fleischer; J. E. Beck; R. Zibelli

[57] ABSTRACT

A device which brakes a drive motor having a rotor adapted to be axially displaced when the motor winding is de-energized. A braking member moves with the rotor so that when the motor winding is deenergized, the circumferential surface of the braking member engages the stationary member to frictionally stop the rotation of the rotor. When the braking member engages the stationary member, the exterior circumferential surface thereof pivots to position substantially the entire surface of the exterior circumferential surface in contact with the stationary member. Energization of the motor moves the braking member with the rotor away from the stationary member and the exterior surface of the braking member pivots to disengage from the stationary member enabling the rotor to rotate.

11 Claims, 2 Drawing Sheets

BRAKING DEVICE

This invention relates generally to a braking device for drive motors, and more particularly concerns a cone brake.

Drive motors employ different types of braking mechanisms. For example, the brake may be a solid piece of cork riveted to an aluminum flange. However, it has been found that a brake of this type, when disengaging, frequently sticks preventing the motor from starting. Another type of brake is a cone brake. A cone brake is generally used with an axially displaceable rotor. In a typical cone brake, a truncated cone is mounted on an axially displaceable rotor and moves axially until the truncated cone mounted thereon engages a conical cup. As the truncated cone contacts the cup, the frictional torque therebetween stops the rotation of the cone and rotor. The frictional torque generated is a function of the surface areas in contact with one another. Heretofore, the truncated cone exterior surface and interior conical surface of the cup were mismatched resulting in only partial surface to surface contact. This mismatch is caused by machining tolerances and mounting misalignments of the respective axes. Clearly, it is highly desirable to have full surface to surface contact to maximize the contract area and the resuming frictional torque. In addition, it is highly desirable to have positive dis-engagement of the surfaces when the motor is energized.

Various types of braking systems have been developed. The following disclosures appear to be relevant:

U.S. Pat. No. 3,822,768,
Patentee: Sebulke,
Issued: July 9, 1974.
U.S. Pat. No. 4,030,576,
Patentee; Pringle,
Issued: June 21, 1977.
U.S. Pat. No. 4,099,601,
Patentee: Pittman,
Issued: July 11, 1978.
U.S. Pat. No. 4,103,763,
Patentee: Gluckner et al,
Issued: Aug. 1, 1978.

The relevant portions of the foregoing disclosures may be briefly summarized as follows:

U.S. Pat. No. 3,822,768 discloses a conical brake for use with an electric motor. A threaded mechanism is used to compensate for brake pad wear. This maintains the shaft displacement constant.

U.S. Pat. No. 4,030,576 describes a disk brake assembly using a spring loaded actuator for engaging an annular conical brake.

U.S. Pat. No. 4,099,601 discloses a solenoid actuated cone brake for stopping a motor driven roller. A spring deactivates the brake when the solenoid is de-energized.

U.S. Pat. No. 4,103,763 describes a conical disk brake assembly with a brake disk that moves axially under a spring force applied on the rotor of the motor when the motor is de-energized. This axial movement causes the brake disk to engage an oppositely positioned brake lining on a stationary cup. When the motor is energized, the rotor moves axially to space the brake disk from the brake lining.

In accordance with one aspect of the present invention, there is provided a device for braking a drive motor of the type having a rotor adapted to be axially displaced when the motor winding is de-energized. The device includes a braking member rotatably coupled to the rotor and having a pivotable exterior circumferential surface. A stationary member is positioned to be spaced from the exterior circumferential surface of the braking member when the motor winding is energized. The braking member moves axially with the rotor when the motor winding is de-energized so that the exterior surface of the braking member engages the stationary member and pivots to position substantially the entire surface of the exterior circumferential surface in contact with the stationary member to frictionally stop the rotation of the rotor. When the motor is energized, the braking motor moves with the rotor away from the stationary member and the exterior circumferential pivots to disengage the exterior surface of the braking member from the stationary member.

Other features of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
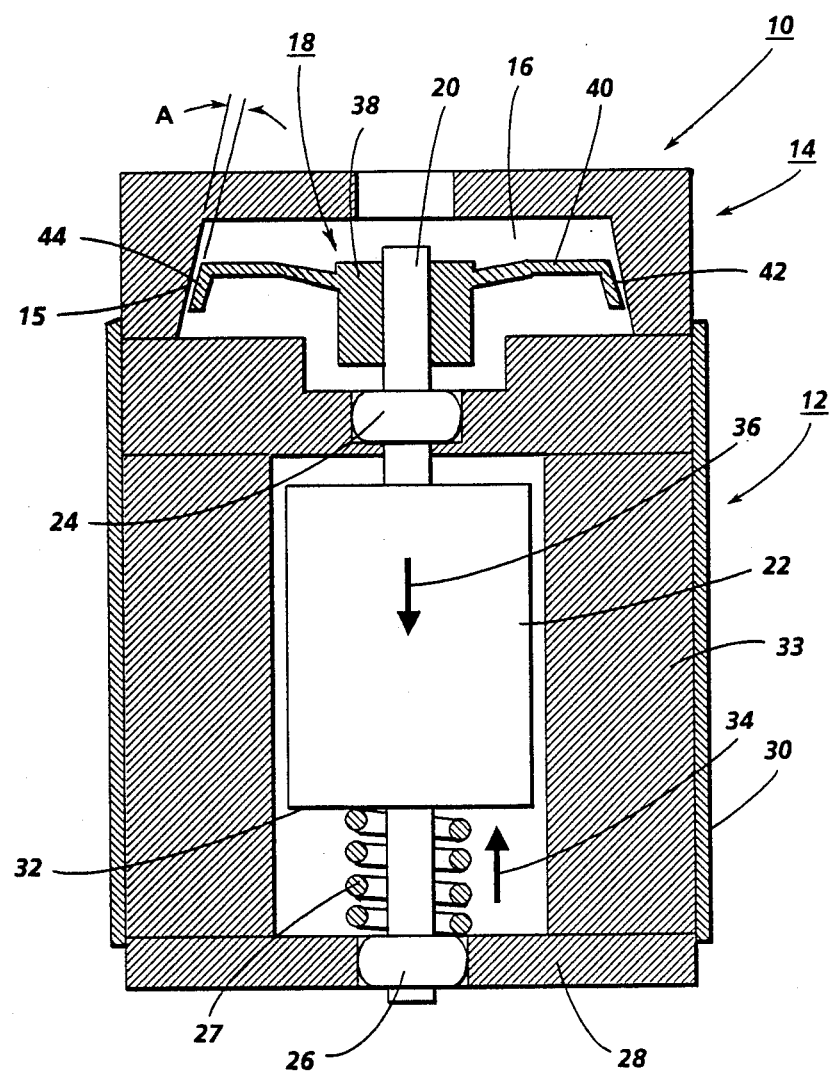
FIG. 1 is a schematic elevational view depicting the cone brake of the present invention.

Referring now to FIG. 1, there is shown the braking device of the present invention, indicated generally by the reference numeral 10, for use with a drive motor, indicated generally by the reference numeral 12. Braking device 10 includes a stationary member indicated generally by the reference numeral 14. Stationary member 14 has an open ended chamber 16. The interior surface 15 of chamber 16 of stationary member 14 is configured in the shape of a truncated cone. A braking member, indicated generally by the reference numeral 18, is mounted on an extension of shaft 20 to rotate in unison therewith. Rotor 22 of drive motor 12 is also mounted on shaft 20. Shaft 20 is mounted axially slidably in bearings 24 and 26. A coil spring 27 is interposed between the end wall 28 of motor housing 30 and end 32 of rotor 22. If the motor winding or stator 33 is de-energized, spring 27 causes axial displacement of rotor 22 in the direction of arrow 34. The spring force exerted by spring 27 on end 32 of rotor 22 moves shaft 20, in the direction of arrow 34, until braking member 18 engages interior surface 15 of stationary member 14 stopping the rotation of rotor 22. Upon energization of motor winding 33, the electromagnetic force between the energized stator 33 and rotor 22 axially displaces rotor 22 in the direction of arrow 36. This compresses spring 27 and spaces braking member 18 from stationary member 14 enabling rotor 22 to rotate freely. Braking member 18 includes a hub 38 mounted on an extension of shaft 20. A concave web 40 attaches rim 42 to hub 38. The exterior circumferential surface of rim 42 is configured in the shape of a truncated cone. Rim 42 is compliant with web 40 being deflectable. In this way, as rim 42 engages and disengages from surface 15 of stationary member 14, rim 42 pivots. When motor winding 33 is energized and rim 42 is spaced from surface 15, the half angle of the cone formed by the exterior circumferential surface of the rim is less than the half angle of the cone formed by interior surface of the stationary member. The difference in cone half angles, A, is about 2°. When stator winding 33 is de-energized, spring 27 moves rotor 22 in the direction of arrow 34 until rim 42 contacts interior surface 15. Since the half angle of the cone formed by the exterior circumferential surface of the rim is less than the half angle of the cone formed by interior surface of the stationary member by about 2°, the major diameter of the cone of rim 42 contacts the interior surface 15 of stationary member or cup 14 first in a self wedging action. As braking member 18 continues to move axially in the direction of arrow 34 due to the spring force exerted by spring 27 on rotor 22, the combined action of the compliant rim and the deflection of web 40 pivot rim 42 so that full surface to surface contact occurs between surface 44 of rim 42 and interior surface 15. This results in an amplified surface contact force to thereby develop consistent braking over the entire cone surface.

Figure 2:
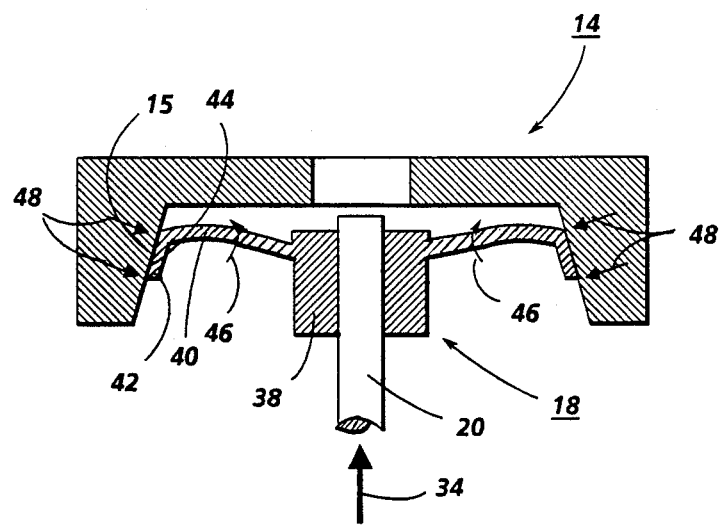
FIG. 2 is a schematic elevational view showing the FIG. 1 rotating braking member engaging the stationary member.

Turning now to FIG. 2, there is shown braking member 18 in engagement with cup or stationary member 14. As depicted thereat, web 40 deflects in the direction of arrow 46 due to forces 48 exerted on rim 42. This causes surface 44 of rim 42 to be in full contact with surface 15 of stationary member 14. Thus, rim 42 pivots to position substantially the entire surface of the exterior circumferential surface in contact with the interior surface of the stationary member to frictionally stop the rotation of the rotor.

Figure 3:
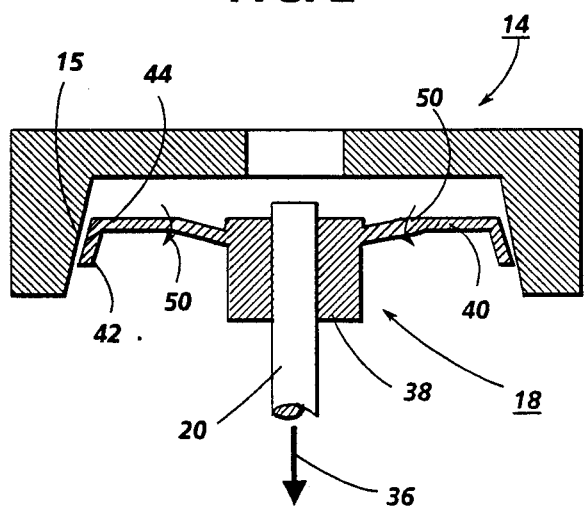
FIG. 3 is a schematic elevational showing the FIG. 1 rotating braking member spaced from the stationary member.

Referring now to FIG. 3, there is shown braking member 18 spaced from cup or stationary member 14. This occurs when stator winding 33 is energized causing braking member 18 to move with rotor 22 away from stationary member 14. As braking member 18 moves away from the interior surface 15 of cup 14, web 40 deflects, in the direction of arrow 50, to the undeflected position and pivots rim 42 away from surface 15 of cup 14, thereby progressively reducing the contact area. This pivoting action assists in the disengagement of the braking member from the stationary member when the motor is energized. This tends to neutralize the self braking action of rim 42 during engagement of braking member 18 with stationary member 14. When braking member 18 is spaced from stationary member 14, the half angle of the cone formed by the exterior circumference surface of the rim is less than the half angle of the cone formed by interior surface of the stationary member by about 2°. Braking member 14 is made from a molded material, preferably a plastic such as acetal.

In recapitulation, it is evident that the braking device of the present invention includes a braking member having a compliant rim coupled to a hub by a deflectable web. When the motor winding is de-energized, a spring resiliently urges the rotor to move in an axial direction causing the rim to contact the cup of the stationary member. This results in the web deflecting so that the rim pivots resulting in substantially the entire exterior truncated, conical surface of the rim engaging the interior truncated conical surface of the stationary member. This results in amplified face contact forces providing substantially uniform braking over the exterior of the rim and the interior surface of the stationary member. When the motor is de-energized, the braking member moves with the rotor away from the stationary member and the web deflects to pivot the rim away from the interior surface of the stationary member enabling the rotor to rotate freely.

It is, therefore apparent that there has been provided in accordance with the present invention, a cone braking device that fully satisfies the aims and advantages hereinbefore set forth. While this invention has been descibed in conjunction with a specific embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A device for braking a drive motor of the type having a rotor adapted to be axially displaced when the motor winding is de-energized, wherein the improvement includes:
    a braking member rotatably coupled to the rotor and having a pivotable exterior circumferential surface; and
    a stationary member positioned to be spaced from the exterior circumferential surface of said braking member when the motor winding is energized, said braking member moving axially with the rotor when the motor winding is de-energized so that the exterior surface of said braking member engages said stationary member and pivots to position substantially the entire surface of the exterior circumferential surface in contact with said stationary member to frictionally stop the rotation of the rotor, said braking member moving with the rotor away from said stationary member when the motor is energized and the exterior surface of said braking member pivoting to disengage from said stationary member to enable the rotor to rotate.

2. A device according to claim 1, further including means for resiliently moving the rotor in an axial direction when the motor winding is de-energized.

3. A device according to claim 2, wherein the exterior circumferential surface of said braking member is a rim defining a truncated cone.

4. A device according to claim 3, wherein said braking member includes:
    a hub coupled to the rotor; and
    a deflectable web attaching said hub to said rim.

5. A device according to claim 4, wherein said stationary member includes a cup having a truncated conical interior surface adapted to receive the exterior circumferential surface of said rim.

6. A device for braking a drive motor of the type having a rotor adapted to be axially displaced when the motor winding is de-energized, wherein the improvement includes:
    a braking member rotatably coupled to the rotor and having a pivotable exterior circumferential surface wherein the exterior circumferential surface of said braking member comprises a rim defining a truncated cone, a hub coupled to the rotor, and a deflectable web attaching said hub to said rim;
    a stationary member positioned to be spaced from the exterior circumferential surface of said braking member when the motor winding is energized, said braking member moving axially with the rotor when the motor winding is de-energized so that the exterior surface of said braking member engages said stationary member and pivots to position substantially the entire surface of the exterior circumferential surface in contact with said stationary member to frictionally stop the rotation of the rotor, said braking member moving with the rotor away from said stationary member when the motor is energized and the exterior surface of said braking member pivoting to disengage from said stationary member to enable the rotor to rotate, said stationary member comprising a cup having a truncated conical interior surface adapted to receive the exterior circumferential surface of said rim, wherein the half angle of the cone formed by the exterior circumferential surface of said rim is less thant he half angle of the cone formed by the interior surface of said cup; and means for resiliently moving the rotor in an axial direction when the motor winding is de-energized.

7. A device according to claim 6, wherein the half angle of the cone formed by the exterior circumferential surface of said rim is about 2° less than the half angle of the cone formed by the interior surface of said cup.

8. A device according to claim 6, wherein said resilient means includes a spring.

9. A device according to claim 6, wherein said rim is compliant.

10. A device according to claim 9, wherein said braking member is made preferably from a molded material.

11. A device according to claim 10, wherein said braking member is made preferably from a plastic material.

* * * * *